(12) United States Patent
Cai

(10) Patent No.: US 8,887,628 B2
(45) Date of Patent: Nov. 18, 2014

(54) LIQUID FOOD HEATING, STIRRING AND FOAMING CUP

(76) Inventor: Jianming Cai, Guangdong (CN)

(*) Notice: Subject to any disclaimer, the term of this patent is extended or adjusted under 35 U.S.C. 154(b) by 762 days.

(21) Appl. No.: 13/133,863

(22) PCT Filed: Aug. 7, 2009

(86) PCT No.: PCT/CN2009/073135
§ 371 (c)(1),
(2), (4) Date: Jun. 9, 2011

(87) PCT Pub. No.: WO2010/078753
PCT Pub. Date: Jul. 15, 2010

(65) Prior Publication Data
US 2011/0232506 A1    Sep. 29, 2011

(30) Foreign Application Priority Data

Jan. 9, 2009  (CN) ..................... 2009 1 00366394

(51) Int. Cl.
*A47J 43/046*    (2006.01)
(52) U.S. Cl.
CPC .................................... *A47J 43/046* (2013.01)
USPC ................. 99/484; 99/275; 99/452; 366/273; 426/519
(58) Field of Classification Search
CPC ..... A47J 43/046; B01F 3/0827; B01F 3/0818
USPC ................. 219/443.1, 201; 99/484, 275, 452; 366/274, 146, 273; 416/3; 426/519
See application file for complete search history.

(56) References Cited

U.S. PATENT DOCUMENTS

| | | | | |
|---|---|---|---|---|
| 5,834,739 | A * | 11/1998 | Lockwood et al. | ........ 219/468.1 |
| 6,805,312 | B2 * | 10/2004 | Capp | ............................. 241/36 |
| 2007/0221068 | A1 * | 9/2007 | Boussemart et al. | ........... 99/279 |

FOREIGN PATENT DOCUMENTS

WO  PCT/CN2009/073135    11/2009

* cited by examiner

*Primary Examiner* — Jianying Atkisson
(74) *Attorney, Agent, or Firm* — Tianhua Gu; Global IP Services

(57) ABSTRACT

A cup device for heating, stirring and foaming liquid foods comprises a cup, a cup lid, a handle, a stirrer, a motor drive disk, a plurality of magnets, an electric motor, a hot plate, a boil dry thermostat, a thermostat, a micro switch, a transformer, a controller, a heating base, a button, a button circuit board, connecting wires and bolts. The controller controls the work of the hot plate and the stirrer to input air into liquid foods, and therefore producing a lot of foams. The cup can be separated from the heating base, which enables it to be cleaned by a dishwasher. The stirrer turns along with the electric motor by magnetic attraction. The stirrer of removed cup will not naturally get off. The heating base only supplies power when the cup is put on it and it automatically cuts off power supply when the cup is removed.

6 Claims, 8 Drawing Sheets

LIQUID FOOD HEATING, STIRRING AND FOAMING CUP

CROSS REFERENCE TO RELATED PATENT APPLICATION

The present application is the US national stage of PCT/CN2009/073135 filed on Aug. 7, 2009 which claims the priority of the Chinese patent application No. 2009100366394 filed on Jan. 9, 2009, which application is incorporated herein by reference.

FIELD OF THE INVENTION

The present invention relates to the technology field of kitchen utensils, particularly to a cup device used for heating, stirring and foaming liquid foods.

BACKGROUND OF THE INVENTION

There are no similar products in the market. Liquid food heating (foaming) pots available in the market are not easy to clean and not capable of being washed in dishwashers.

SUMMARY OF THE INVENTION

The present invention aims at providing a liquid food heating, stirring and foaming cup device which, through connection of a hot plate, a thermostat, an electric motor, a micro switch, a stirrer and so on, controls the hot plate and the stirrer, heats the food until its temperature reaches about 60° C., inputs air into food to produce a lot of foams, and therefore, improves food taste.

The cup device comprises a cup, a cup lid, a handle, a stirrer, a motor drive disk, a magnet, an electric motor, a hot plate, a dry thermostat, a thermostat, a micro switch, a transformer, a controller, a heating base, a button, a button circuit board, connecting wires and bolts. The controller controls the hot plate and the stirrer through connection with the hot plate, the thermostat and the electric motor. The cup lid opens and closes freely and the cup can be put on and off the base easily.

The present invention employs an aluminum hot plate for heating with mature techniques and other components are either standard components or made of general materials. Therefore, the invented cup device is easy to manufacture.

DETAILED DESCRIPTION OF THE INVENTION

Figure 1:
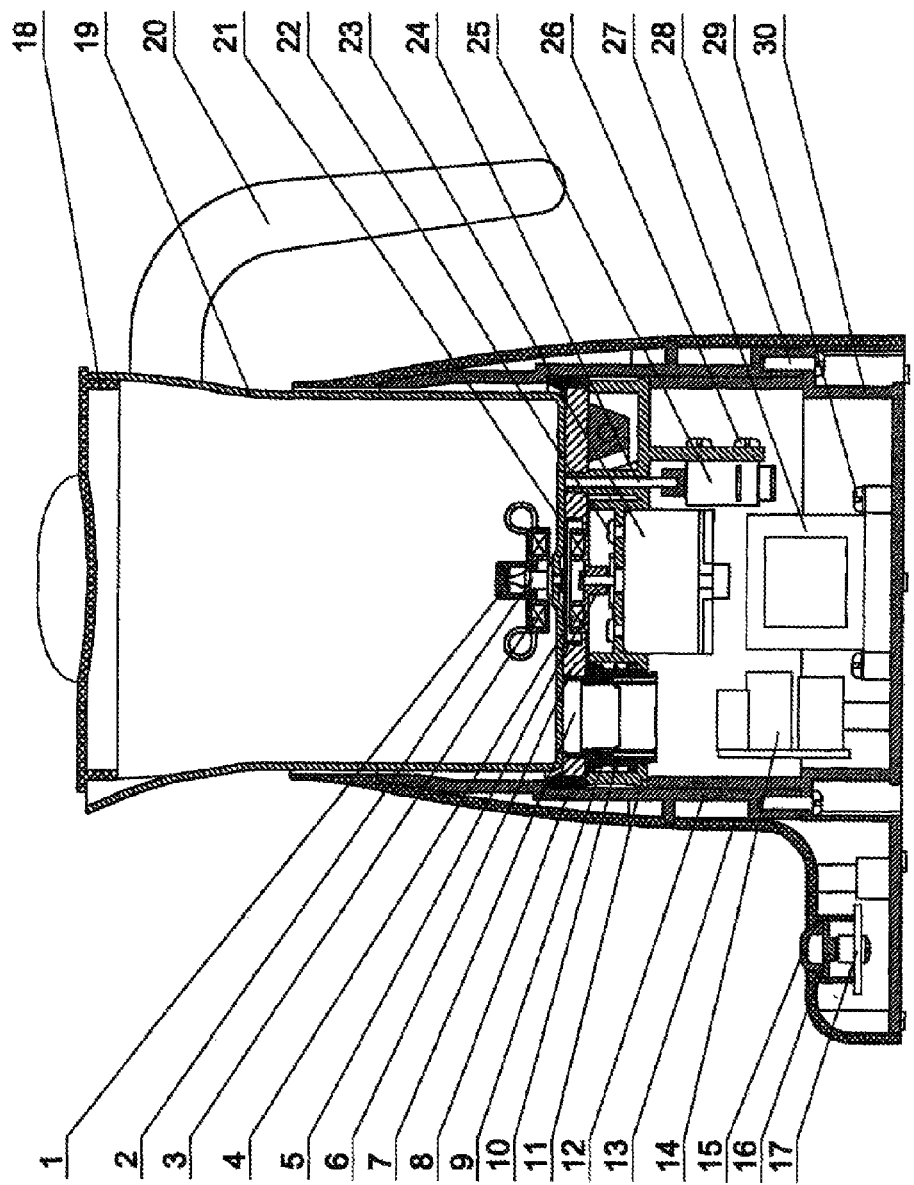
FIG. 1 shows the structure of the present cup device.

Set the retaining ring 21 into the hole of the hot plate 6. Set the heat insulation ring 8 into the inner ring 12. Insert the thermostat 7 into the thermostat ring 9 and set the spring 10 outside it. Then put the thermostat ring 9 into the hole of the thermostat of the hot plate 6; Set the electric motor 23 on the retaining ring 11 with the bolt 22. Insert the motor drive disk 5 with the magnets 4 into the shaft of the electric motor 23. Push the handspike 24 into the hole of the retaining ring 11. Set the micro switch 25 on the retaining ring 11 with the bolt 26, the button of the micro switch 25 against the handspike 24. Then push the retaining ring 11 into the inner ring 12 to fix the hot plate 6; Insert the inner ring 12 into the shell 13 of the heating base; Set the button 15, the plastic pad 16 and the button circuit board 17 in the button hole of the shell 13 of the heating base. Set the dry thermostat on the hot plate 6; Fix the transformer 27 with the bolt 29 and the controller 14 on the bottom cover 30 after the inner wires are connected. Then fix tightly the bottom cover 30 with the transformer 27, the controller 14 and wires on the retaining ring 11 and the shell 13 of the heating base; Rivet the stirring shaft 2 to the bottom of the cup 19. Set the stirrer 1 with the magnet 3 inside into the stirring shaft 2. Fix the handle 20 tightly outside the cup 19. Put the cup cover 18 on the cup 19. Then put the cup 19 into the hole on the shell 13 of the heating base and on the hot plate 6.

As FIG. 1 shows, there are a cup 19 with a handle 20, a stirrer 1 with a stirring shaft 2 set with magnets 3, and a cover 18 on the cup; On the heating base, there are a hot plate 6, a thermostat 7, a dry thermostat, an electric motor with a motor drive disk 5 and magnets 4, a transformer 27, a controller 14, a micro switch 25 connected to a handspike 24, a button 15, a plastic pad 16 and an button circuit board 17; The cup 19 is put in the hole on the shell 13 of the heating base and on the hot plate 6. The weight of the cup 19 pushes the handspike 24 down and the button of the micro switch 25 is therefore pressed. At the same time, the cup 19 pushes the thermostat 7 down and the spring 10 presses the heat detecting surface of the thermostat 7 tightly against the bottom of the cup 19. And the invented liquid food heating, stirring and foaming cup is now ready to work.

Figure 2:
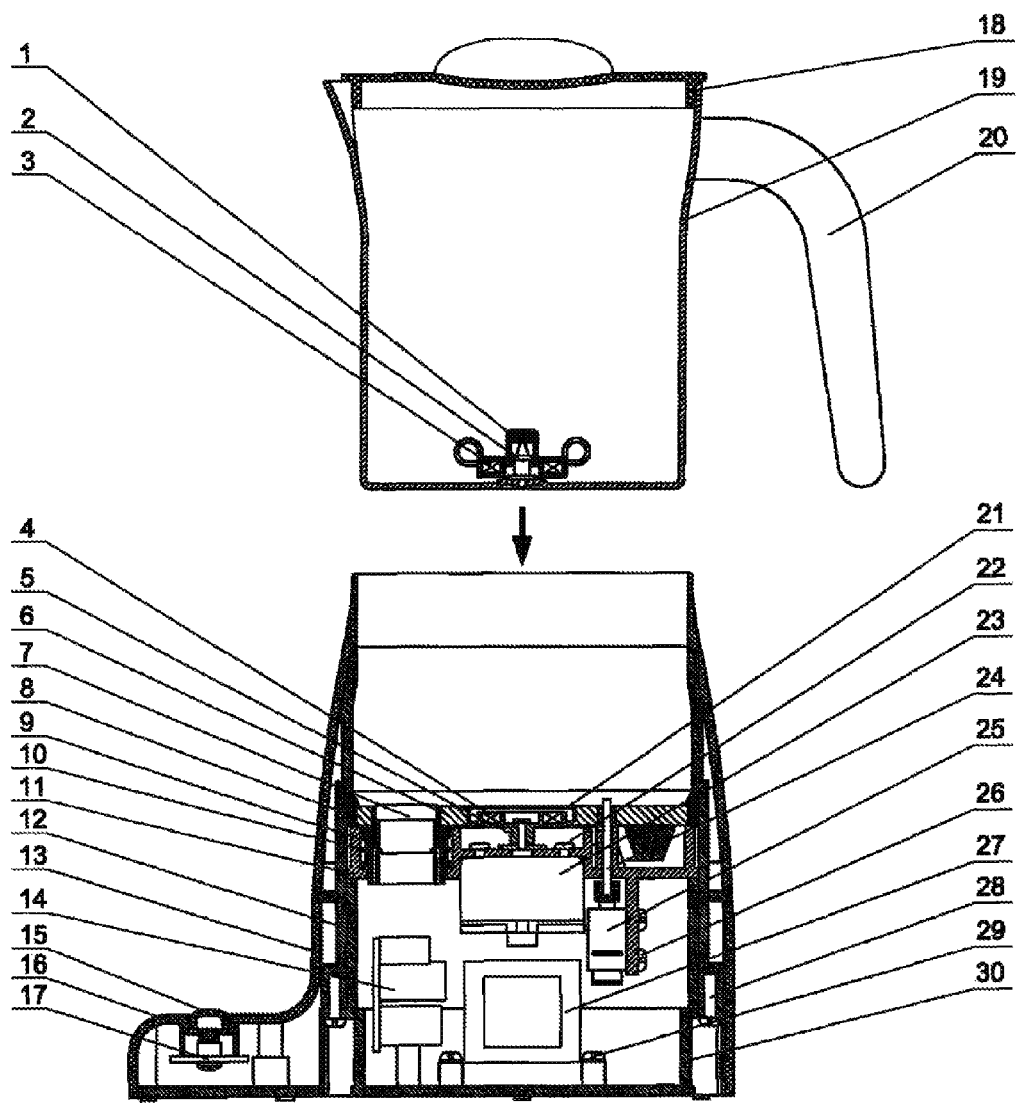
FIG. 2 shows the separation of the cup from the heating base.

As FIG. 2 shows, the cup 19 can be separated from the heating base. When the cup 19 is removed from the heating base, the spring 10 pushes the thermostat 7 on the hot plate 6 upward and the button of the micro switch 25 pushes the handspike 24 upward through an input spring at the same time. Now the invented liquid food heating, stirring and foaming cup stops working.

Figure 3:
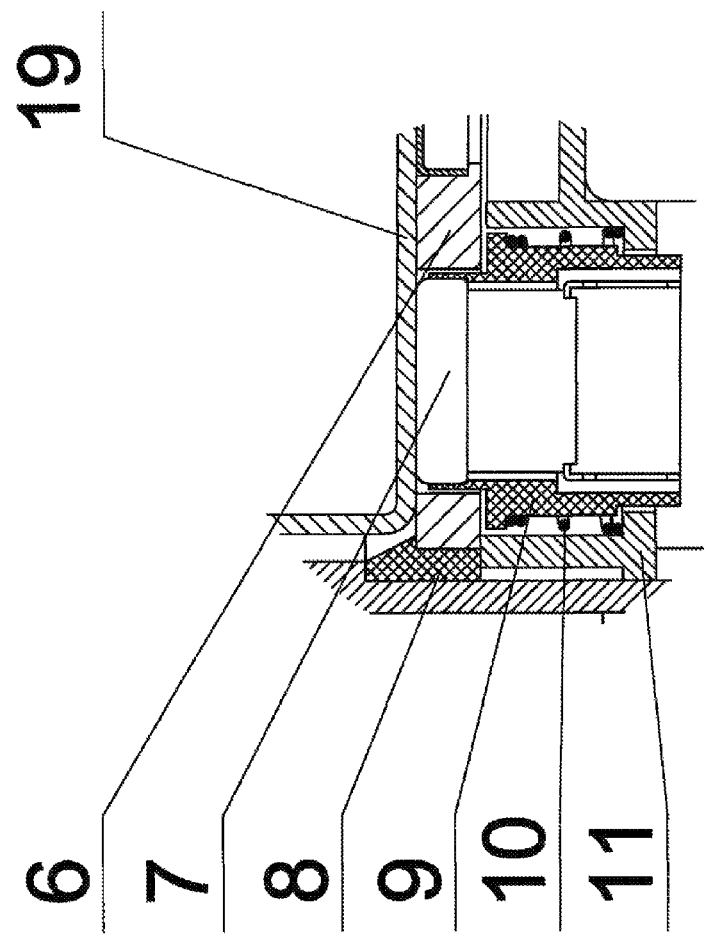
FIG. 3 shows the structure of the temperature controlling device when the cup is put on the base.
Figure 4:
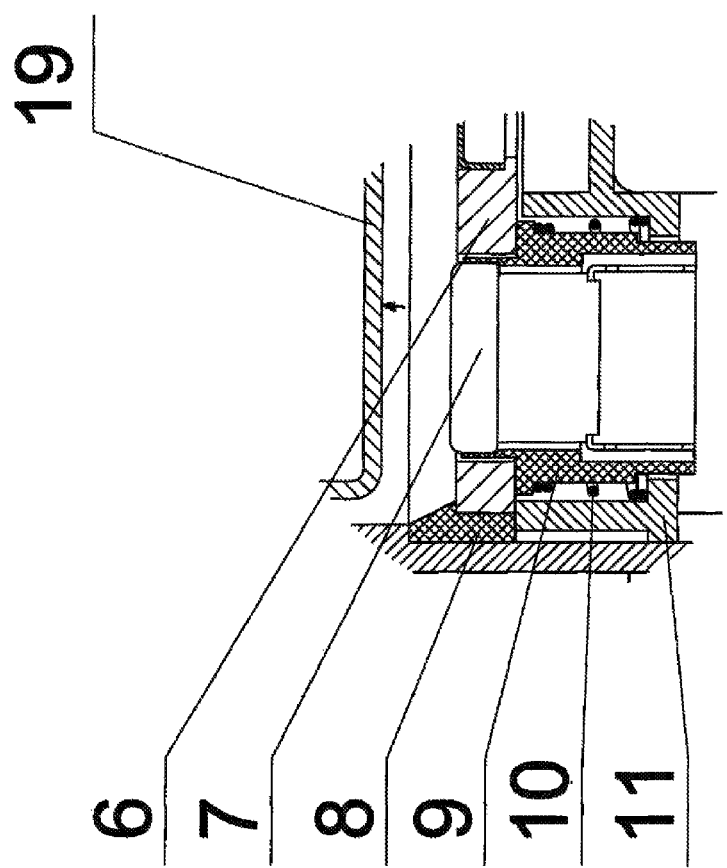
FIG. 4 shows the structure of the temperature controlling device when the cup is removed from the base.

As FIG. 3 and FIG. 4 show, the thermostat 7 is set in the thermostat ring 9, outside which there is a spring 10. One end of the spring 10 is against the thermostat ring 9 and the other, against the retaining ring 11. The spring 10 connects the heat detecting surface of the thermostat 7 to the bottom of the cup 19 well. When the cup 19 is removed from the hot plate 6, the heat detecting surface of the thermostat 7 is higher than the heating and supporting surface of the hot plate 6. The thermostat ring 9 supports the thermostat 7 and the spring 10, and reduces heat transmission from the hot plate to the thermostat 7. And the thermostat 7 detects the temperature through the bottom of the cup 19.

Figure 5:
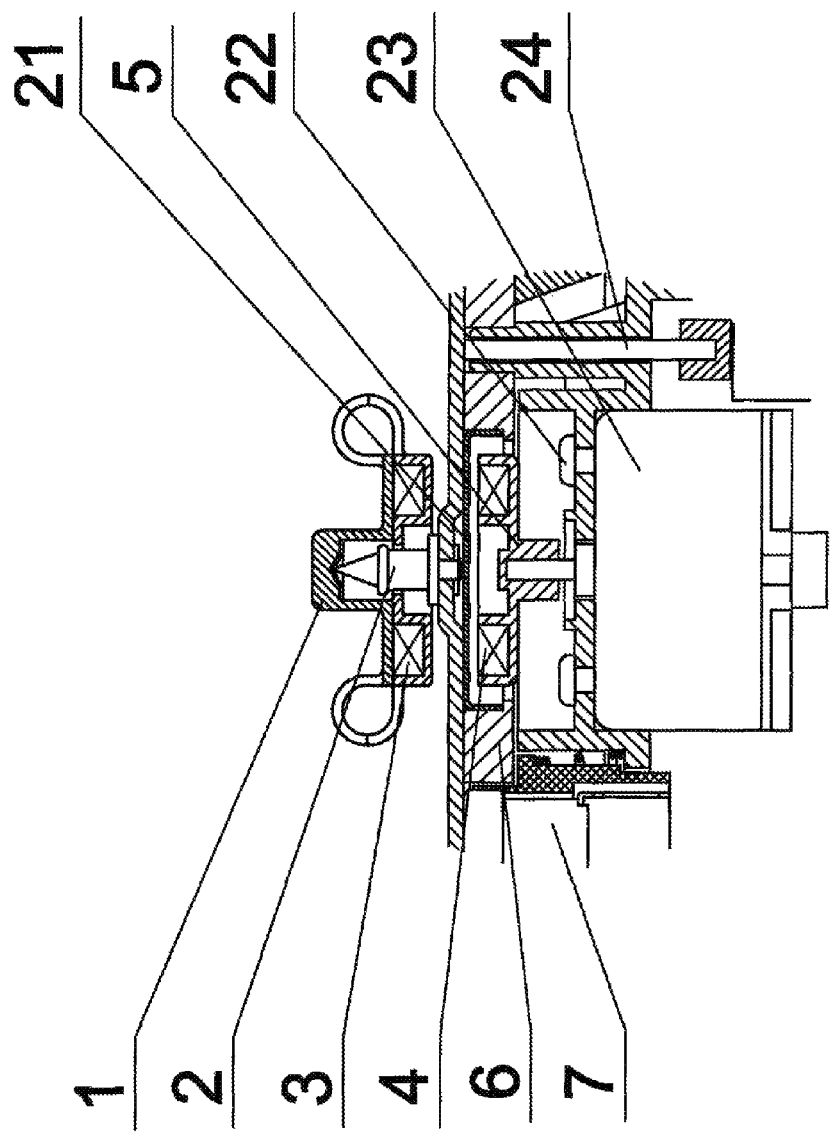
FIG. 5 shows the transmission structure of the present invention.

As FIG. 5 shows, the stirring shaft 2 is riveted to the bottom of the cup 19, functioning as the axis of the stirrer 1 turning. Magnets 3 are set in the stirrer 1; The motor drive disk 5 with magnets 4 is inserted in the shaft of the electric motor 23; According to the principle of magnetic attraction, the turning of the electric motor 2 brings along the turning of the stirrer 1. The top of the stirring shaft 2 is pointed, which reduces the friction between the stirrer 1 and the stirring shaft 2.

Figure 6:
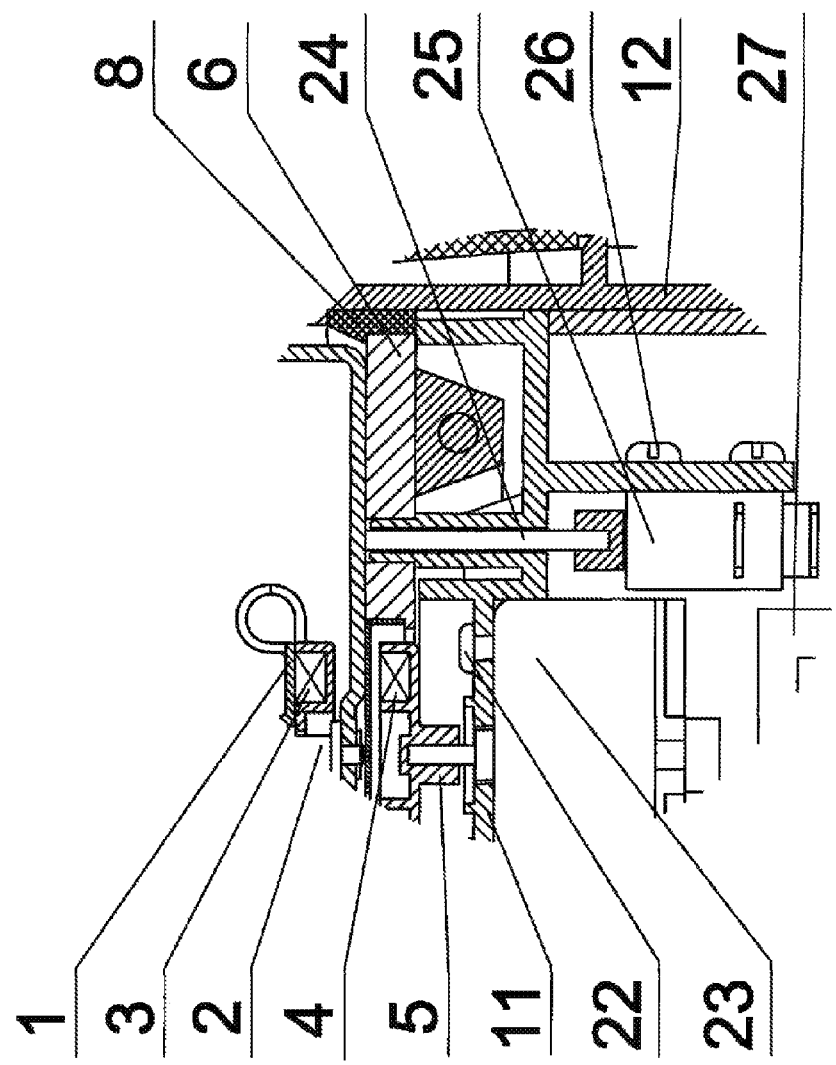
FIG. 6 shows the structure of the micro switch when the cup is put on the base.
Figure 7:
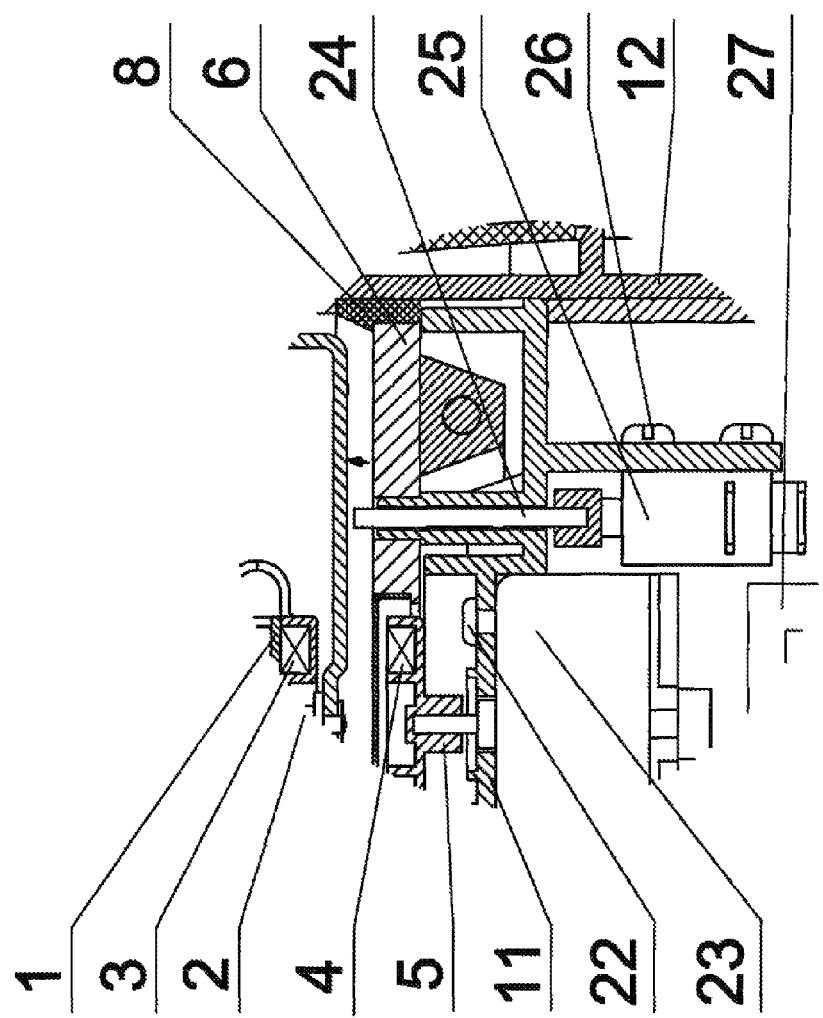
FIG. 7 shows the structure of the micro switch when the cup is removed from the base.

As FIG. 6 and FIG. 7 show, the handspike 24 inserted into the hole of the retaining ring 11 is supported by the button of the micro switch 25. The end of the handspike 24 is higher than the heating and supporting surface of the hot plate 6. When the cup 19 is put on the hot plate 6, the cup 19 pushes the handspike 24, which pushes the input spring of the micro switch 25, and the elasticity presses the button of the micro switch 25; When the cup 19 is removed from the hot plate 6, the input spring of the micro switch 25 pushes the button back, which pushes the handspike 24 upward. The micro switch 25 controls the electricity.

Figure 8:
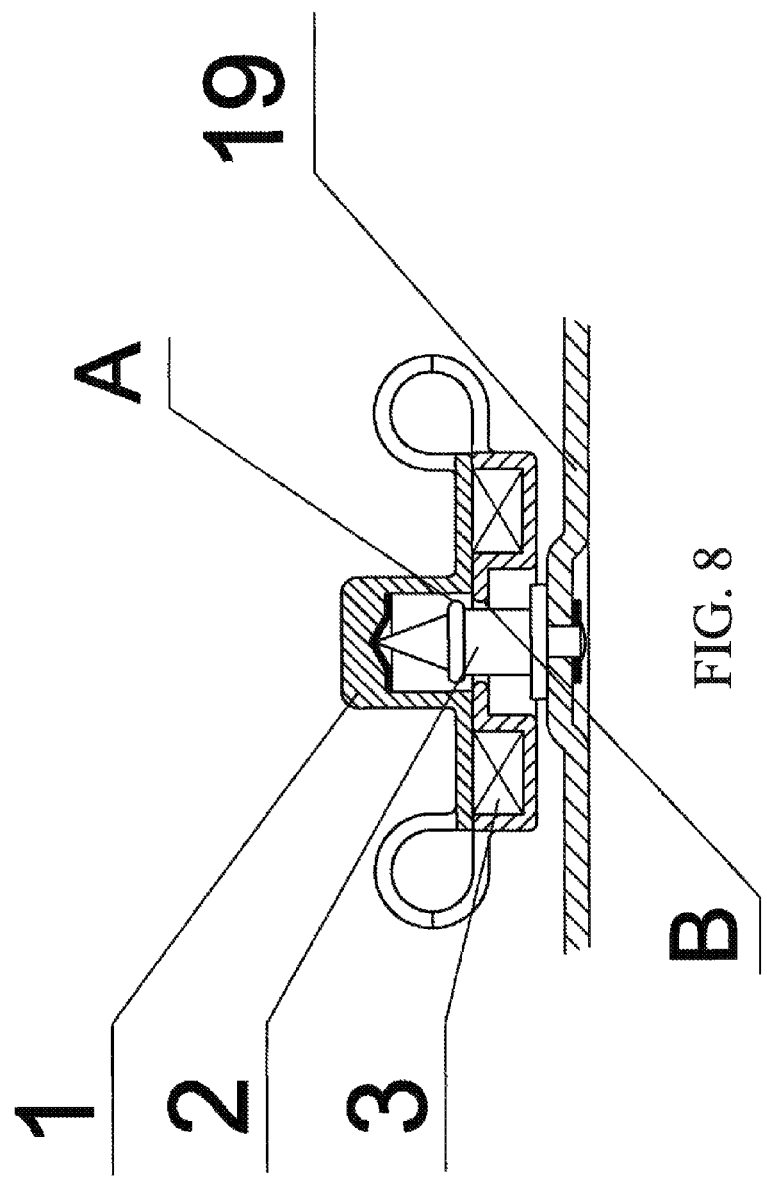
FIG. 8 shows the structure of the stirrer of the present invention.

As FIG. 8 shows, there is an outer bulgy rim A on the stirring shaft 2 riveted to the bottom of the cup 19. The stirrer 1 has an inner bulgy rim B, the diameter of which is smaller than that of the outer bulgy rim A. If the stirring shaft 2 is to be put in the stirrer 1, an angle and a certain amount of pressure are needed in order to insure that the stirrer 1 will not naturally separate from the stirring shaft 2 when the cup 19 is removed.

What is claimed is:

1. A cup device for heating, stirring and foaming liquid foods, the cup device comprising a cup, a cup lid, a handle, a stirrer, a motor drive disk, a plurality of magnets, an electric motor, a hot plate, a boil dry thermostat, a thermostat, a micro switch, a transformer, a controller, a heating base, a button, a button circuit board, connecting wires and bolts, wherein a first retaining ring (21) is installed into a center hole of the hot plate (6), a heat insulation ring (8) pressed into the hot plate (6) is sleeved inside an inner ring (12), the thermostat (7) is inserted into a thermostat ring (9), a spring (10) is sleeved outside the thermostat ring (9), and the assembled thermostat ring (9) is placed into a side hole in the hot plate (6);

the electric motor (23) is bolted (22) on a second retaining ring (11), the motor drive disk (5) loaded with the plurality of magnets (4) is sleeved onto the shaft of the electric motor (23);

a handspike (24) is inserted into a hole of the second retaining ring (11), the micro switch (25) is bolted (26) on the second retaining ring (11), a button of the micro switch (25) is against the handspike (24), an assembled second retaining ring (11) formed is pushed into the inner ring (12) to fix the hot plate (6);

the inner ring (12) is inserted into a shell (13) of the heating base;

the button (15), a plastic pad (16) and the button circuit board (17) are installed through a button hole in the shell (13) of the heating base;

the boil dry thermostat is installed on the hot plate (6);

the wired transformer (27) and the controller (14) are bolted (29) on a bottom cover (30), and the bottom cover (30) along with the transformer (27), the controller (14) and the power wires are tightly bolted (28) on the second retaining ring (11) and the shell (13) of the heating base;

and a stirring shaft (2) is riveted to the bottom of the cup (19), the stirrer (1) with sealed plurality of magnets (3) is installed outside the stirring shaft (2), the handle (20) is fastened outside the cup (19), the cup lid (18) is placed on the cup (19), and the cup (19) is inserted into a hole on the shell (13) of the heating base and is seated on the hot plate (6).

2. The cup device for heating, stirring and foaming liquid foods according to claim 1, wherein the cup (19) is detachable from the heating base.

3. The cup device for heating, stirring and foaming liquid foods according to claim 1, wherein the thermostat (7) is placed inside the thermostat ring (9), outside which the spring (10) is sleeved, whose one end is against the thermostat ring (9) and the other end is against the retaining ring (11).

4. The cup device for heating, stirring and foaming liquid foods according to claim 1, wherein the stirring shaft (2) functioned as the rotary axis of the stirrer (1) is riveted to the bottom of the cup (19), the plurality of magnets (3) are sealed in the stirrer (1), and the motor drive disk (5) loaded with the plurality of magnets (4) is sleeved onto the shaft of the electric motor (23).

5. The cup device for heating, stirring and foaming liquid foods according to claim 1, wherein the handspike (24) inserted through the hole of the retaining ring (11) is supported by the button of the micro switch (25), and the end of the handspike (24) is higher than the heating and supporting surface of the hot plate (6).

6. The cup device for heating, stirring and foaming liquid foods according to claim 1, wherein there is an outer bulgy rim A on the stirring shaft (2) riveted to the bottom of the cup (19), there is an inner bulgy rim B in the stirrer (1), and the diameter of the inner bulgy rim B is smaller than that of the outer bulgy rim A.

* * * * *